M. C. BARON.

BROODER.

APPLICATION FILED JAN. 11, 1921.

Reissued Oct. 18, 1921.

15,207.

2 SHEETS—SHEET 1.

Inventor.

Mary Chase Baron

By. Howard E. Barlow

Attorney.

M. C. BARON.

BROODER.

APPLICATION FILED JAN. 11, 1921.

Reissued Oct. 18, 1921.

15,207.

2 SHEETS—SHEET 2.

Inventor,

Mary Chase Baron

By Howard E. Barlow

Attorney.

UNITED STATES PATENT OFFICE.

MARY CHASE BARON, OF HAMPDEN MEADOWS, RHODE ISLAND.

BROODER.

15,207. Specification of Reissued Letters Patent. Reissued Oct. 18, 1921.

Original No. 1,329,494, dated February 3, 1920, Serial No. 289,710, filed April 12, 1919. Application for reissue filed January 11, 1921. Serial No. 436,571.

*To all whom it may concern:*

Be it known that I, MARY CHASE BARON, a citizen of the United States, residing at Hampden Meadows, in the State of Rhode Island, have invented certain new and useful Improvements in Brooders, of which the following is a specification, reference being had therein to the accompanying drawing.

This invention relates to certain new and useful improvements in brooders of the hot water heated type, and has for its object to improve the hot water heating system and the control of the same whereby a uniform temperature may be maintained throughout the brooding chamber.

The invention further consists in setting the hot water tank in substantially a horizontal plane and spacing the top and bottom walls but a short distance apart to accommodate comparatively thin volume of water of extended area, the tank also having a heat-deflecting hood spaced just above it and so shaped as to deflect the heat from the tank downward in the brooding space upon the backs of the chicks below.

A still further object of the invention is to place the heat generator outside of the brooding space and provide an air space and a separating wall between the generator and the brooding chamber to prevent that portion of the chamber nearest the generator from becoming overheated, as when any one space becomes hotter than another, particularly in cold weather, the chicks crowd to that place and many become jammed and smothered.

The invention further resides in an improved form of hot water tank or boiler having an extension overlying a source of heat and embodying a flue passing through the boiler through which heat from the said source is conducted.

The invention has for another aim to provide independent regulators controllable by thermostatic devices within the brooding space or controlling the escape of heat from the brooding space and also for regulating the current of heat through the flue of the boiler.

The invention still further resides in means for conducting the odors and gases from the heating lamp chamber, and it consists in the features of construction and the arrangements and combinations hereinafter described and claimed, reference being had to the accompanying drawing wherein—

Figure 1:
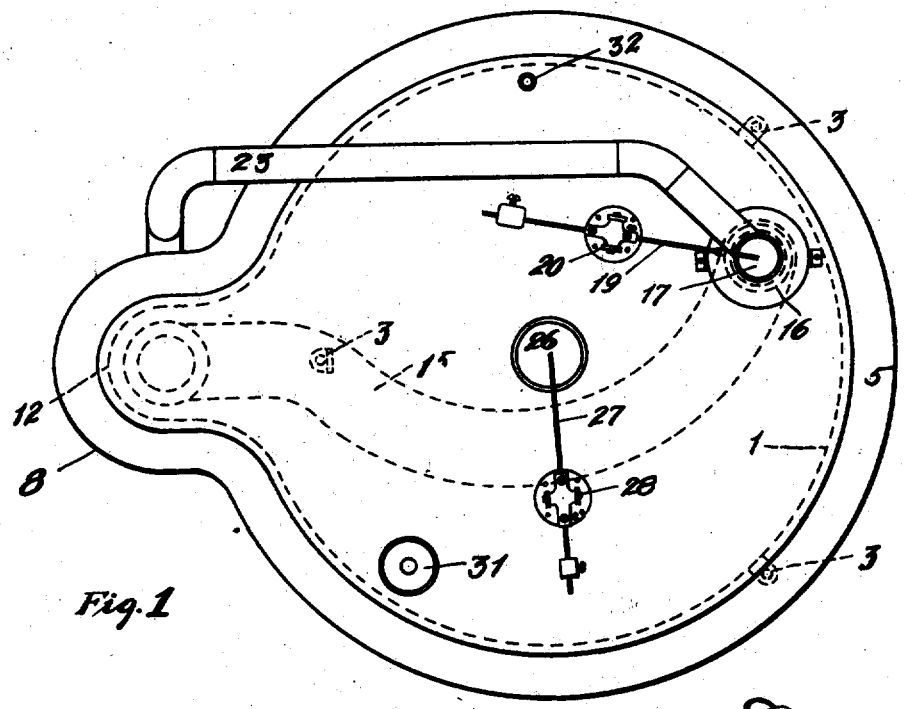
Figure 1 is a top plan view of the improved brooder.
Figure 2:
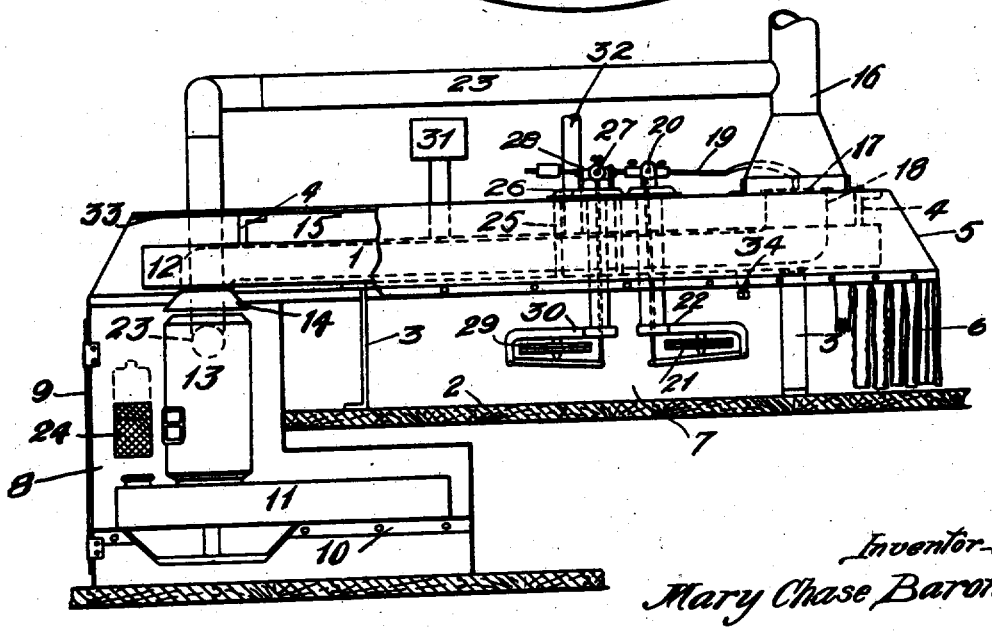
Fig. 2 is a side elevation thereof with parts removed and other portions depicted in section.
Figure 3:
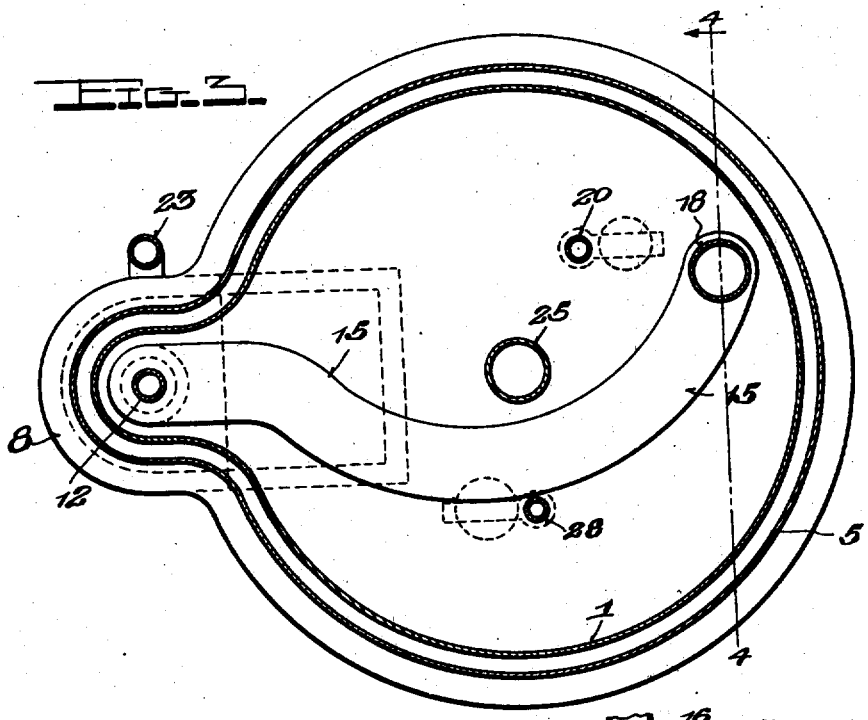
Fig. 3 is a horizontal section taken on line 3—3 of Fig. 4.
Figure 4:
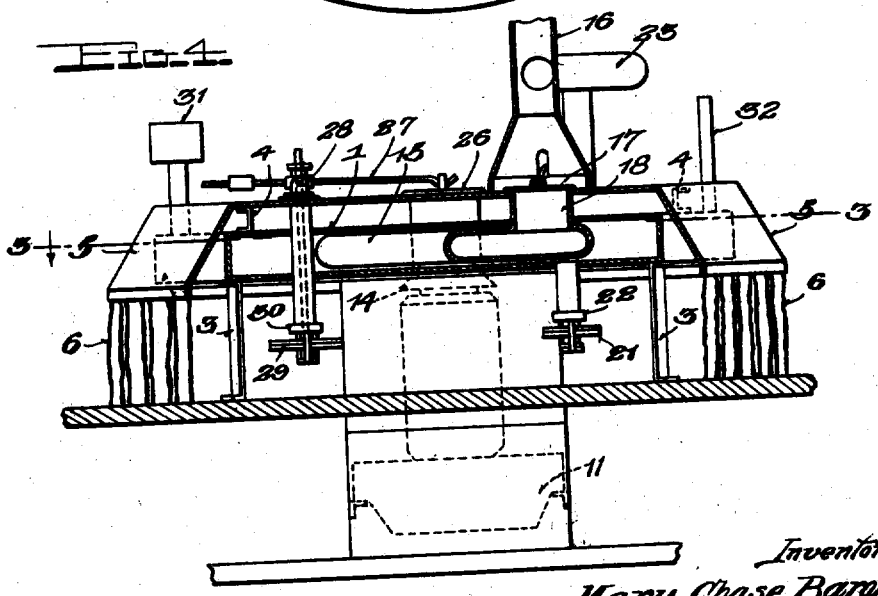
Fig. 4 is a section on line 4—4 of Fig. 3.

It is found in the practical use of so-called colony brooders of this character for successfully raising the most delicate little chicks, to be of utmost importance to heat the same with hot water instead of hot air for several reasons; first, hot air heat dries the moisture from the hovering space, particularly during cold weather when an intense heat is required, to such an extent that the chicks have a tendency to contract a distemper causing running at the nose, similar to a cold, preventing them from thriving, which effect is quite absent where hot-water heat is employed: second, hot-air heat cannot be kept uniform in temperature whereas the temperature from hot water heating changes comparatively slowly, thus when oil burning heaters are employed the heat diminishes as the oil becomes low, which effect is at once noticeable in a brooder where hot air only is employed; third, by hot air the brooder can be more readily overheated and kill the chicks, even with a moderately low flame in the heater, but the characteristic evenness of hot water heat is generally known. All of these difficulties are effectually obviated by the use of my improved water tank as the water therein will maintain its heat for an extended period, even should the lamps burn out and remain extinguished for quite a period the latent heat in the water will be sufficient to keep the chicks alive for several hours.

The following is a detailed description of one form of my improved brooder by which the desired effects are produced:—

With reference to the drawings, 1 designates the hot water tank or boiler which is preferably horizontally-disposed. The tank is preferably constructed of metal and has comparatively flat top and bottom walls spaced a short distance apart to inclose a comparatively thin body of water of extended area so as to radiate the maximum amount of heat, and still be of sufficient volume to hold the heat and maintain a uniform temperature which is of utmost importance. This tank is supported above the flooring 2 of the brooding space or brooder by legs 3 and placed just the proper distance above the backs of the chicks to keep their vitals warm the same as when under the wings of the mother hen and a sheet metal hood 5 is supported a short distance above this tank by short legs 4 to prevent the escape of the rising heat.

This hood is also preferably constructed of metal and preferably provided with a flaring outer edge by which the direct heat from the tank which is collected beneath it, is deflected downwardly into the brooding space below. Then again by forming this hood of uncovered or noninsulated metal some heat is permitted to radiate from its heated outer surface to raise the temperature of the surrounding air in the room in which the brooder is located thereby tempering the adjacent interior of the room, so that when the little chicks run out from under the brooder hood as they would from under the wings of the mother hen, they will not become unduly chilled.

To one side of the hood 5 is a lamp chamber 8 being accessible through door 9 and containing a suitable support 10 for a heating lamp 11, preferably of the blue-flame type. The boiler has a lateral extension 12 overlying the lamp chimney 13 and opening directly over the latter is the wide mouth 14 of a heating flue 15. This flue is in the form of a flattened rectangular sectioned pipe disposed within the boiler and leading from the lateral boiler extension 12 through the boiler in a somewhat arcuate course and opening upwardly through the top of the boiler, at a substantially diametrically opposite point, into the lower end of an escape flue or chimney 16 which is superposed upon the hood. A damper plate 17 is adapted for setting on and closing the discharge end 18 of the heating flue 15, said plate being carried by one end of a lever 19 fulcrumed in a hood-supported bracket 20 and controlled by means of a thermostat 21 arranged within the brooding chamber and suitably supported by the bracket 22. When the damper plate is seated on the flue extension or end 18 the gases and odors backing up into and accumulating in the lamp chamber are conducted therefrom through a bypass ventilating pipe 23 that provides a shunt or direct passage from the lamp chamber to the chimney 16. A valve controlled air inlet 24 is provided in the lamp chamber to promote combustion, as is obvious.

A ventilating flue or pipe 25 passes upwardly through the boiler and top of the hood, and this ventilating flue is controlled by means of a damper plate 26 operating over the upper end thereof, said plate being likewise supported on one end of a weighted lever 27 that is pivoted in bracket 28, on the hood, and controlled by the thermostat 29 arranged within the brooding space on the bracket 30. An expansion tank 31 is mounted above the boiler and connected therewith, and an air vent pipe 32 rises from the boiler at one side through which the boiler may be filled, an outlet 34, in its bottom, providing a drain therefor. The hood is lined with asbestos sheeting 33 to limit heat radiation through its walls.

It is also found to be of importance to provide an air space 35 and a wall 36 between the lamp chimney 13 and the brooding space 7 so as to effectually prevent that part of the brooder adjacent the lamp from becoming overheated, as in severe weather if any particular zone becomes warmer than another the chicks will crowd in that direction with the result that many become smothered and crushed and it is for this reason that I have placed the heat generator outside of the brooding chamber proper and positioned this wall between the brooding space and the generator, it being found in practice that the temperature of the entire brooding chamber should be maintained as nearly uniform as possible in order to obtain the best results.

In operation, the burner or heater 11 is ignited to discharge its products of combustion in the inlet end of the boiler contained flue, the opposite end being closed by the damper plate 17. The odors from the lamp are permitted to escape through the by-pass flue so that the chick compartment will be free from poisonous gases. In addition to the heat entering the boiler flue, it will also act on the boiler extension to further heat the water in the boiler in an expeditious manner.

As the temperature in the brooding space rises the thermostat 29 is designed to operate first in lifting its damper plate off from the ventilating pipe 25. If the temperature then continues to rise the thermostat 21 will operate to lift the damper plate 17 from off the boiler flue so that the products of combustion will readily pass from the flue to the chimney 16.

The arcuate or circular configuration of the flattened flue affords increased heating area and also permits the ventilating pipe 25 to be disposed centrally of the hood. The ends of the heating flue are welded to make a tight joint with the boiler. The shallow flat circular boiler is quickly heated and forms a roof for the entire brooding chamber. By reason of the extended boiler portion and the flattened heating flue therein, but a small film of water is brought in contact with the flue and all the heat generated in the lamp or heater chamber will act on the said boiler extension so that after the water is once heated there will be no trouble in maintaining a uniform heat in the brooder.

I claim:

1. A brooder, comprising a drum shaped boiler, a hood having an approximately circular body portion, said boiler having a substantial portion of its body inclosed within and shaped concentrically with respect to the hood and having an offset portion projecting outside of the periphery of the body portion of the hood, said hood having a downwardly flared peripheral edge to direct the heat under said boiler, and a heating flue positioned to contact with the water in said boiler, and having its inlet end located in said offset portion of the boiler.

2. A brooder, comprising a comparatively thin drum shaped boiler of extended area supported in a horizontal position a short distance above the floor to provide a brooding space therebeneath, a hood having a circular body portion, said boiler having a substantial portion of its body inclosed within and shaped concentrically with respect to said hood and having an offset attenuated portion projected outside of the periphery of the body portion of the hood, said hood being supported in position by said boiler and in spaced relation therefrom, said hood further having an outwardly flaring edge adapted to deflect the heat on the inside thereof downwardly into the brooding space, curtains about the edge of the hood, and a heating flue positioned to contact with the water in the boiler, and having its inlet end located in said offset portion of the boiler.

3. A brooder, comprising a comparatively thin drum shaped boiler of extended area supported in a horizontal position a short distance above the floor to provide a brooding space therebeneath, a hood having a circular body portion, said boiler having a substantial portion of its body inclosed within and shaped concentrically with respect to said hood and having an offset attenuated portion projected outside of the periphery of the body portion of the hood, said hood being supported in position by said boiler and in spaced relation therefrom, a heating flue positioned to contact with the water in the boiler and having its inlet end located in the center of said offset portion, curtains depending from the peripheral edge of the body of the hood and extending from one side opposite said offset portion of the boiler to the other side thereof, a heating element to be positioned under the inlet of said flue, a partitioning protection wall under said boiler and spaced from said heating element and forming a continuation of said curtains between the ends thereof and about the peripheral edge of the body of said hood.

4. A brooder, comprising a comparatively thin drum shaped boiler of extended area supported in a horizontal position a short distance above the floor to provide a brooding space therebeneath, a hood having a circular body portion, said boiler having a substantial portion of its body inclosed within and shaped concentrically with respect to said hood and having an offset attenuated portion projected outside of the periphery of the body portion of the hood, said hood being supported in position by said boiler, and in spaced relation therefrom, curtains about the edge of the hood, a heating flue positioned to contact with the water in the boiler and having its inlet end located in the center of said offset portion, and a vertical ventilating opening through the center of said boiler and through said hood, whereby the water heated at said offset portion is caused to circulate therefrom between the side walls of the boiler and the walls of said opening to supply the entire area of the boiler with uniform heat and means for opening and closing said opening in the hood.

5. A brooder, comprising a comparatively thin drum shaped boiler of extended area supported in a horizontal position a short distance above the floor to provide a brooding space therebeneath, a hood having a circular body portion, said boiler having a substantial portion of its body inclosed within and shaped concentrically with respect to said hood and having an offset attenuated portion projected outside of the periphery of the body portion of the hood, said hood being supported in position by said boiler and in spaced relation therefrom, curtains about the edge of the hood, a chimney rising from the hood at a point substantially opposite the attenuated offset portion of the boiler, a heater positioned under the offset portion of the boiler, a flue passing through the boiler and having its inlet end located in the center of said offset portion over said heater and its outlet end discharging into said chimney.

6. A brooder, comprising a comparatively thin drum shaped boiler of extended area supported in a horizontal position a short distance above the floor to provide a brooding space therebeneath, a hood having a circular body portion, said boiler having a substantial portion of its body inclosed within and shaped concentrically with respect to said hood and having an offset attenuated portion projected outside of the periphery of the body portion of the hood, said hood being supported in position by said boiler and in spaced relation therefrom, curtains about the edge of the hood, a chimney rising from the hood at a point substantially opposite the attenuated portion of the boiler, a substantially horizontal flue passing through the boiler and having a vertical projecting inlet end opening through the center of said offset portion and its outlet end discharging into said chimney, a heat generating element arranged below the inlet end of said flue, means controlling the passage of heat through said flue and a by-pass extending from said heating element exteriorly of said hood and the brooding space to said chimney.

7. In a brooder, a drum-like boiler having a lateral constricted semi-circular extension, a substantially curved flue in the boiler having one end turned upwardly and extending through the top of the boiler, the opposite end of the flue having a semi-circular peripheral wall lying in concentric spaced relation to the semi-circular wall of the extension and being turned downwardly and extending through the bottom of the boiler, a downwardly flared mouth connected to the downturned end of the flue, a lamp underlying said mouth, a hood inclosing the boiler and having a rim which inclines downwardly, said hood and its rim having a semi-circular extension concentric to and inclosing the boiler extension, a ventilating pipe at the center of the hood extending through the boiler and hood and arranged in the curve of the flue, a thermostat control for the top of the pipe, a damper plate on the upturned end of the flue, and a thermostat control for the damper plate, each of the thermostats being located beneath the boiler.

8. A brooder comprising a drum-shaped boiler, a hood having a circular body portion, said boiler being inclosed by said hood and shaped concentrically therewith, said hood having an attenuated offset portion projecting outside of the periphery of the body portion of the hood, a heating flue positioned to contact with the water in the boiler and having a vertically disposed inlet end located in the offset portion of the boiler and opening through the bottom wall of said offset portion, and a heating element arranged in said inlet end of said flue.

MARY CHASE BARON.